US010820602B2

(12) United States Patent
Garces et al.

(10) Patent No.: US 10,820,602 B2
(45) Date of Patent: Nov. 3, 2020

(54) INDOOR SMOKER WITH SMOKE CONTAINMENT FEATURES

(71) Applicant: Haier US Appliance Solutions, Inc., Wilmington, DE (US)

(72) Inventors: Tomas Garces, Louisville, KY (US); Samuel Vincent DuPlessis, Louisville, KY (US); Stephen Bernard Froelicher, Shepherdsville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 260 days.

(21) Appl. No.: 15/969,880

(22) Filed: May 3, 2018

(65) Prior Publication Data

US 2019/0335772 A1 Nov. 7, 2019

(51) Int. Cl.
*A23B 4/052* (2006.01)
*B01D 53/86* (2006.01)

(52) U.S. Cl.
CPC .......... *A23B 4/0523* (2013.01); *B01D 53/864* (2013.01); *B01D 53/8628* (2013.01); *B01D 53/8643* (2013.01); *B01D 53/8696* (2013.01); *A23V 2002/00* (2013.01); *B01D 2255/1021* (2013.01); *B01D 2255/1023* (2013.01); *B01D 2255/1025* (2013.01)

(58) Field of Classification Search
CPC ......... A23B 4/044; A23B 4/048; A23B 4/052; A23B 4/0523; A23B 4/0526; A23B 4/056
See application file for complete search history.

(56) References Cited

U.S. PATENT DOCUMENTS

| | | | | |
|---|---|---|---|---|
| 4,494,525 A | * | 1/1985 | Albertsen | F23B 5/00 110/203 |
| 4,810,510 A | * | 3/1989 | Lever | A23B 4/056 426/233 |
| 4,934,260 A | | 6/1990 | Blevins | |
| 5,622,100 A | * | 4/1997 | King | A47J 37/1271 126/21 A |
| 5,768,983 A | * | 6/1998 | Treiber | A23B 4/052 99/482 |
| 6,644,178 B2 | * | 11/2003 | Clark | A23B 4/052 99/482 |
| 6,803,065 B1 | * | 10/2004 | Miyamori | A23B 4/056 426/235 |

(Continued)

FOREIGN PATENT DOCUMENTS

| | | | |
|---|---|---|---|
| CN | 209106113 U | * | 7/2019 |
| JP | 55148051 A | * | 11/1980 |
| JP | 2008307217 A | | 12/2008 |

*Primary Examiner* — Jacob J Cigna
(74) *Attorney, Agent, or Firm* — Dority & Manning, P.A.

(57) ABSTRACT

An indoor smoker includes a cabinet defining a discharge vent, a smoking chamber having a chamber outlet, and an exhaust assembly including an exhaust duct and a recirculation duct providing fluid communication between the chamber outlet and the discharge vent. An air handler urges a flow of smoke through a catalytic converter positioned within the exhaust duct to lower volatile organic compounds prior to discharging the smoke. A recirculation port may be defined between the recirculation duct and the exhaust duct upstream of the catalytic converter and a damper may direct the flow of smoke through the recirculation port when the smoke contains unacceptable levels of volatile organic compounds.

20 Claims, 4 Drawing Sheets

(56) References Cited

U.S. PATENT DOCUMENTS

| | | | |
|---|---|---|---|
| 6,868,777 B1 | 3/2005 | Higgins et al. | |
| 6,899,020 B1 * | 5/2005 | Clark | A23B 4/052 |
| | | | 99/482 |
| 8,418,684 B2 * | 4/2013 | Robinson, Jr. | B01D 53/8687 |
| | | | 126/19 R |
| 9,683,747 B2 * | 6/2017 | Raghavan | A21B 3/04 |
| 10,473,336 B2 * | 11/2019 | Livchak | B01D 53/76 |
| 2003/0140800 A1 * | 7/2003 | Clark | A23B 4/052 |
| | | | 99/482 |
| 2007/0221199 A1 * | 9/2007 | Hake | F24C 15/205 |
| | | | 126/299 R |
| 2016/0360762 A1 | 12/2016 | Mann | |
| 2018/0279633 A1 * | 10/2018 | Qiu | A23B 4/0523 |

* cited by examiner

– 1 –
INDOOR SMOKER WITH SMOKE CONTAINMENT FEATURES

FIELD OF THE INVENTION

The present subject matter relates generally to indoor smokers, and more particularly to smoke containment and suppression systems for indoor smokers.

BACKGROUND OF THE INVENTION

Conventional smokers include a smoking chamber and a firebox positioned within or fluidly coupled to the smoking chamber. The firebox is filled with a combustible material, such as wood or wood byproducts that are ignited or otherwise heated to generate smoke and/or heat. The heat and smoke are routed into the smoking chamber to impart flavor on and cook food items positioned within the smoking chamber. One or more heating elements may be positioned within the smoking chamber and the firebox to maintain the temperatures necessary both for cooking the food and for generating the desired amount of smoke.

Conventional smokers are used outdoors and simply exhaust smoke directly outside through a chimney or vent. Notably, such smoke frequently contains harmful byproducts of the combusted fuel, such as volatile organic compounds (VOCs) or other harmful emission. These byproducts, as well as the large amount of smoke generated by the combusted fuel, generally prohibit the use of smokers inside the home. Although fume hoods or exhaust systems may be used to route the smoke from indoors to outdoors, such systems would be complex, costly, and frequently not practical or effective.

Accordingly, a smoker that has features for permitting safe indoor use would be useful. More specifically, an indoor smoker with smoke containment and features for eliminating or suppressing harmful byproducts of the combustion process would be particularly beneficial.

BRIEF DESCRIPTION OF THE INVENTION

Aspects and advantages of the invention will be set forth in part in the following description, may be apparent from the description, or may be learned through practice of the invention.

In one aspect of the present disclosure, an indoor smoker is provided defining a vertical, a lateral, and a transverse direction. The indoor smoker includes a cabinet defining a discharge vent and a smoking chamber positioned within the cabinet and defining a chamber inlet and a chamber outlet. An exhaust duct provides fluid communication between the chamber outlet and the discharge vent and an air handler is operably coupled with the exhaust duct for urging a flow of smoke from the smoking chamber, through the exhaust duct, and out of the discharge vent. A catalytic converter is positioned within the exhaust duct for lowering volatile organic compounds from the flow of smoke.

In another aspect of the present disclosure, an exhaust assembly for an indoor smoker is provided. The indoor smoker includes a cabinet defining a discharge vent and a smoking chamber having a chamber outlet. The exhaust assembly includes an exhaust duct providing fluid communication between the chamber outlet and the discharge vent and an air handler positioned within the exhaust duct for urging a flow of smoke from the smoking chamber, through the exhaust duct, and out of the discharge vent. A catalytic converter is positioned within the exhaust duct for lowering volatile organic compounds from the flow of smoke. A recirculation duct extends between the exhaust duct and the discharge vent, a recirculation port is defined between the recirculation duct and the exhaust duct upstream of the catalytic converter, and a damper is operably coupled to the recirculation port and is configured for selectively regulating the flow of smoke through the recirculation port.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. In addition, as used herein, terms of approximation, such as "approximately," "substantially," or "about," refer to being within a ten percent margin of error. Furthermore, the term "smoke" is generally used to refer to the flow of air, smoke, combustion byproducts, or any combination thereof through an appliance.

Figure 1:
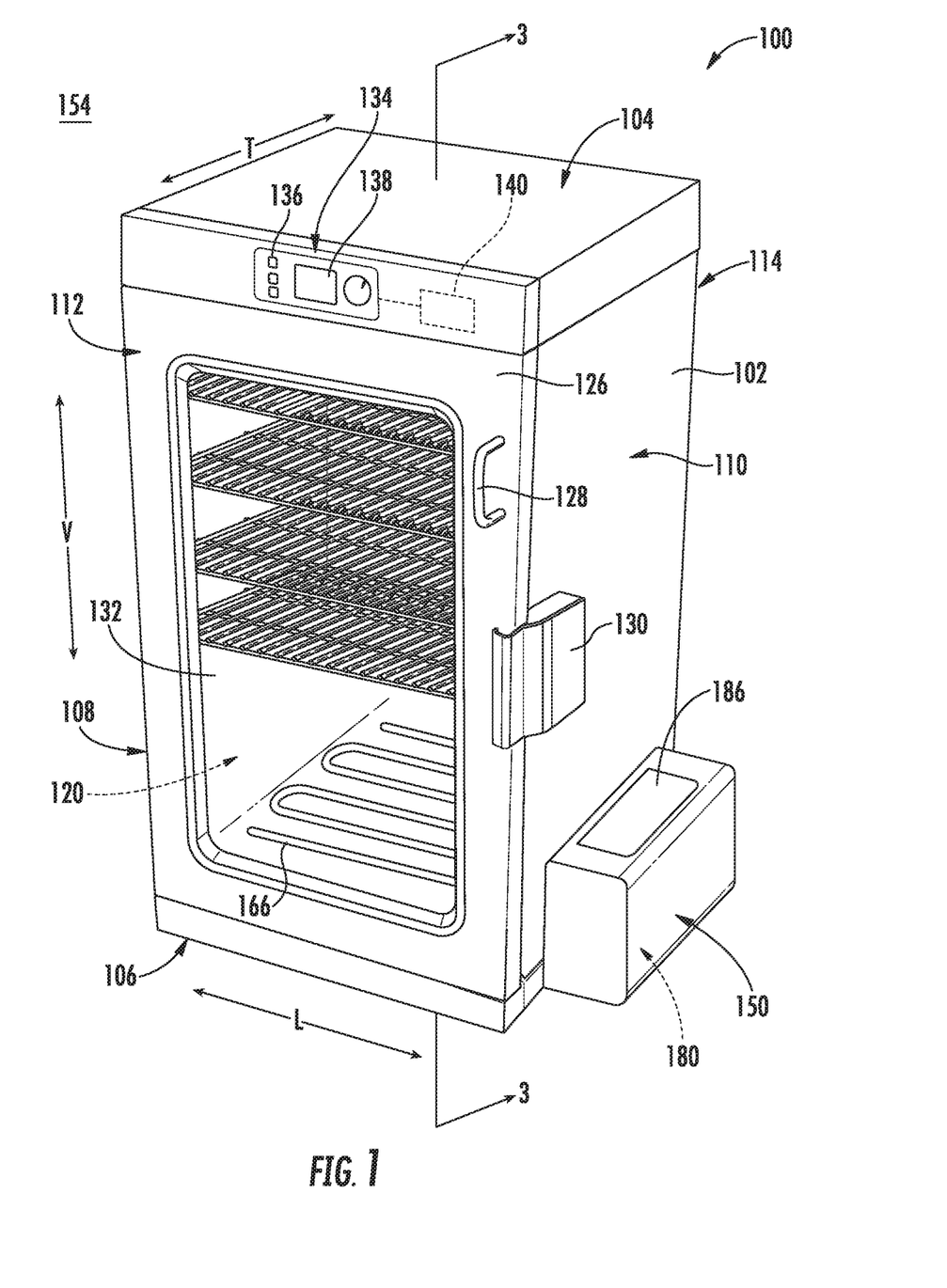
FIG. 1 provides a perspective view of an indoor smoker with all doors in a closed position in accordance with an example embodiment of the present disclosure.
Figure 2:
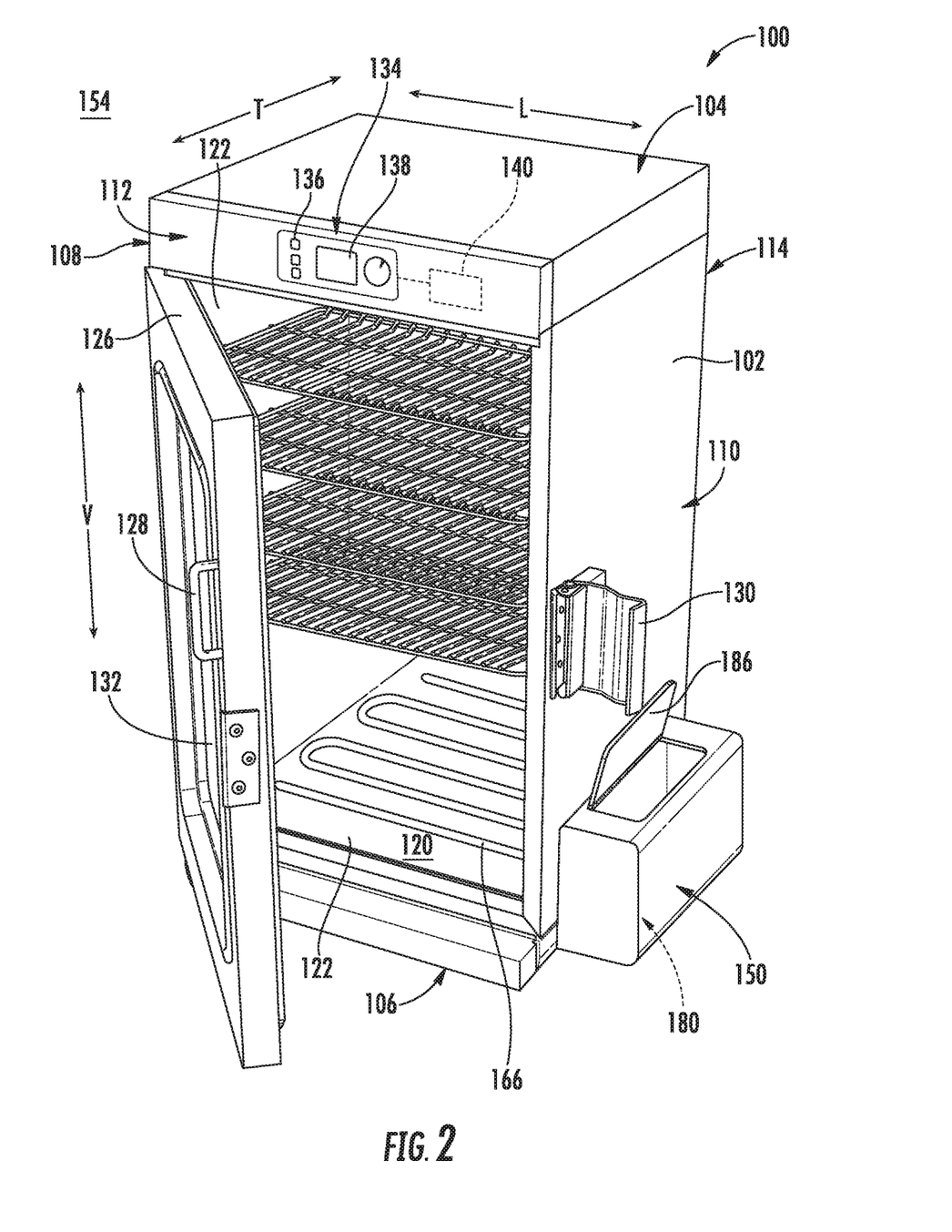
FIG. 2 provides a perspective view the exemplary indoor smoker of FIG. 1 with the doors opened.

FIGS. 1 and 2 provide perspective views of an indoor smoker 100 according to an exemplary embodiment of the present subject matter with doors in the closed position and the open position, respectively. Indoor smoker 100 generally defines a vertical direction V, a lateral direction L, and a transverse direction T, each of which is mutually perpendicular, such that an orthogonal coordinate system is generally defined. As illustrated, indoor smoker 100 includes an insulated cabinet 102. Cabinet 102 of indoor smoker 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a smoking chamber 120 which is configured for the receipt of one or more food items to be cooked and/or smoked. In general, smoking chamber 120 is at least partially defined by a plurality of chamber walls 122. Specifically, smoking chamber 120 may be defined by a top wall, a rear wall, a bottom wall, and two sidewalls. These chamber walls 122 may define smoking chamber 120 and an opening through which a user may access food articles placed therein. In addition, chamber walls 122 may be joined, sealed, and insulated to help retain smoke and heat within smoking chamber 120. In this regard, for example, in order to insulate smoking chamber 120, indoor smoker 100 includes an insulating gap defined between chamber walls 122 and cabinet 102. According to an exemplary embodiment, the insulation gap is filled with insulating material 124 (see FIGS. 3 and 4), such as insulating foam or fiberglass.

Indoor smoker 100 includes a door 126 rotatably attached to cabinet 102 in order to permit selective access to smoking chamber 120. A handle 128 is mounted to door 126 to assist a user with opening and closing door 126 and a latch 130 is mounted to cabinet 102 for locking door 126 in the closed position during a cooking or smoking operation. In addition, door 126 may include one or more transparent viewing windows 132 to provide for viewing the contents of smoking chamber 120 when door 126 is closed and also to assist with insulating smoking chamber 120.

Referring still to FIGS. 1 and 2, a user interface panel 134 and a user input device 136 may be positioned on an exterior of cabinet 102. User interface panel 134 may represent a general purpose Input/Output ("GPIO") device or functional block. In some embodiments, user interface panel 134 may include or be in operative communication with user input device 136, such as one or more of a variety of digital, analog, electrical, mechanical or electro-mechanical input devices including rotary dials, control knobs, push buttons, and touch pads. User input device 136 is generally positioned proximate to user interface panel 134, and in some embodiments, user input device 136 may be positioned on user interface panel 134. User interface panel 134 may include a display component 138, such as a digital or analog display device designed to provide operational feedback to a user.

Generally, indoor smoker 100 may include a controller 140 in operative communication with user input device 136. User interface panel 134 of indoor smoker 100 may be in communication with controller 140 via, for example, one or more signal lines or shared communication busses, and signals generated in controller 140 operate indoor smoker 100 in response to user input via user input devices 136. Input/Output ("I/O") signals may be routed between controller 140 and various operational components of indoor smoker 100 such that operation of indoor smoker 100 can be regulated by controller 140.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of indoor smoker 100, and controller 140 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of an indoor smoker having a single smoking chamber, it should be appreciated that indoor smoker 100 is provided by way of example only. Other smoking appliances having different configurations, different appearances, and/or different features may also be utilized with the present subject matter, e.g., outdoor smokers, conventional oven appliances, or other suitable cooking appliances. Thus, the example embodiment shown in FIG. 1 is not intended to limit the present subject matter to any particular smoking configuration or arrangement. Moreover, aspects of the present subject matter may be used in any other consumer or commercial appliance where it is desirable to remove volatile organic compounds (VOCs) from a flow of exhaust air or gases.

Figure 3:
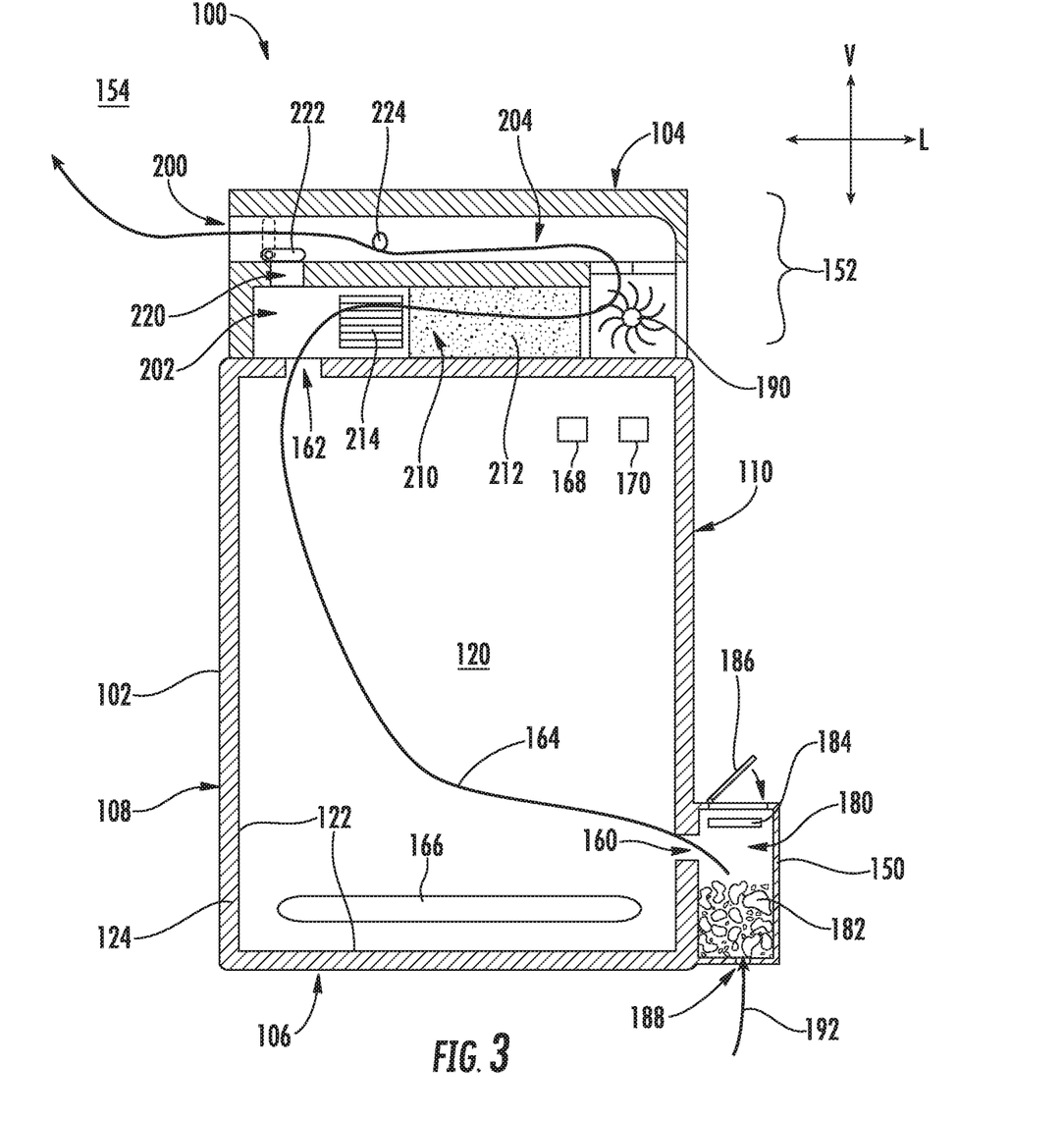
FIG. 3 provides a schematic, cross-sectional view of the exemplary indoor smoker of FIG. 1 taken along Line 3-3 of FIG. 1, with an exhaust system operating in a discharge mode.
Figure 4:
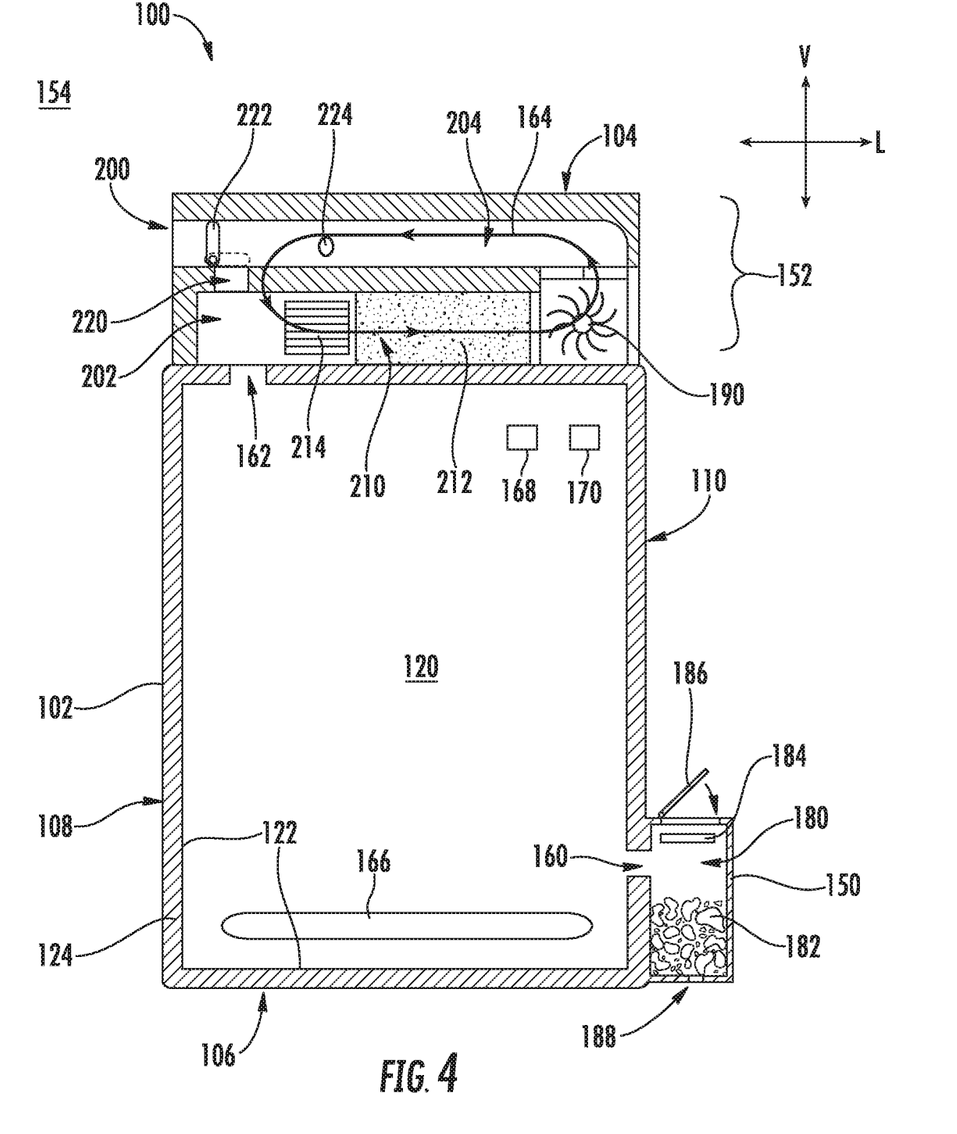
FIG. 4 provides a schematic, cross-sectional view of the exemplary indoor smoker of FIG. 1 taken along Line 3-3 of FIG. 1, with the exhaust system operating in a recirculation mode.

Referring now also to FIGS. 3 and 4, various internal components of indoor smoker 100 and their respective functions will be described according to an exemplary embodiment of the present subject matter. In this regard, FIGS. 3 and 4 illustrate schematic cross-sectional views of indoor smoker 100 taken along Line 3-3 of FIG. 1. As shown, indoor smoker 100 generally includes smoking chamber 120 for receiving items to be cooked/smoked, a firebox 150 for generating smoke, and an exhaust system 152 for safely discharging that smoke into an indoor environment 154 (i.e., outside of indoor smoker 100). Each of these will be described in detail below.

As illustrated, smoking chamber 120 defines a chamber inlet 160 and a chamber outlet 162. In general, a flow of smoke (identified in FIGS. 3 and 4 by reference numeral 164) is drawn into smoking chamber 120 through chamber inlet 160 is discharged from smoking chamber 120 through chamber outlet 162 and exhaust system 152. According to an exemplary embodiment, chamber inlet 160 is defined proximate a bottom 106 of smoking chamber 120 at one side (e.g., second side 110 as shown) and the chamber outlet 162 is defined proximate top 104 of smoking chamber 120 at an opposite side (e.g., first side 108 as shown). In this manner, the flow of smoke 164 may have a tendency of being drawn over and up through the entire smoking chamber 120 for improved smoke coverage.

In order to ensure a desirable cooking temperature within smoking chamber 120, indoor smoker 100 further includes a chamber heater 166 that is positioned within or otherwise in thermal communication with smoking chamber 120 for regulating the temperature in smoking chamber 120. In general, chamber heater 166 may include one or more heating elements positioned within cabinet 102 for selectively heating smoking chamber 120. For example, the heating elements may be electric resistance heating elements, gas burners, microwave heating elements, halogen heating elements, or suitable combinations thereof. Notably, because chamber heater 166 is operated independently of firebox 150 (e.g., as described below), smoking chamber 120 may be maintained at any suitable temperature during a smoking process. More specifically, for example, chamber heater 166 may be turned off or on a very low setting for smoking cheeses or may be turned on high for quickly cooking and smoking meats.

In some embodiments, indoor smoker 100 also includes one or more sensors that may be used to facilitate improved operation of the appliance, such as described below. For example, indoor smoker 100 may include one or more temperature sensors and/or humidity sensors which are generally operable to measure the internal temperature and humidity in indoor smoker 100, e.g., within smoking chamber 120. More specifically, as illustrated, indoor smoker 100 includes a temperature sensor 168 and a humidity sensor 170 positioned within smoking chamber 120 and being operably coupled to controller 140. In some embodiments, controller 140 is configured to vary operation of chamber heater 166 based on one or more temperatures detected by temperature sensor 168 or humidity measurements from humidity sensor 170.

As described herein, "temperature sensor" may refer to any suitable type of temperature sensor. For example, the temperature sensors may be thermocouples, thermistors, or resistance temperature detectors. Similarly, "humidity sensor" may refer to any suitable type of humidity sensor, such as capacitive digital sensors, resistive sensors, and thermal conductivity humidity sensors. In addition, temperature sensor 168 and humidity sensor 170 may be mounted at any suitable location and in any suitable manner for obtaining a desired temperature or humidity measurement, either directly or indirectly. Although exemplary positioning of certain sensors is described below, it should be appreciated that indoor smoker 100 may include any other suitable number, type, and position of temperature and/or humidity sensors according to alternative embodiments.

Referring still to FIGS. 3 and 4, firebox 150 generally defines a smoldering chamber 180 which is generally configured for receiving combustible material 182. As used herein, "combustible material" is generally used to refer to any suitable material positioned within smoldering chamber 180 for generating smoke. Specifically, according to exemplary embodiments, combustible material 182 includes wood or wood byproducts, such as wood chunks, wood chips, wood pellets, or wood resin.

According to the illustrated embodiment, firebox 150 includes a smoldering heater 184 which is positioned in or otherwise in thermal communication with smoldering chamber 180 to smolder combustible material 182 stored in smoldering chamber 180. Similar to chamber heater 166, smoldering heater 184 may include one or more heating elements such as electric resistance heating elements, gas burners, microwave heating elements, halogen heating elements, or suitable combinations thereof. In addition, firebox 150 may include dedicated temperature and/or humidity sensors (not shown) for detecting the temperature and humidity within smoldering chamber 180 for improved smoke generation and regulation.

As used herein, the verb "smolder" or variations thereof is intended to refer to burning a combustible material (e.g., combustible material 182) slowly such that smoke is generated but little or no flame is generated. In this manner, the combustible material is not expended quickly, but a large amount of smoke is generated for the smoking process. Notably, the burn rate of combustible material and the amount of smoke generated is regulated using smoldering heater 184 positioned within smoldering chamber 180. For typical combustible material used in smokers, e.g., wood and wood byproducts, a typical smoldering temperature is between about 650° F. and 750° F. However, the exact temperature may vary depending on the combustible material used, the air flow rate through smoldering chamber 180, the level of combustible material 182, and other factors.

Referring again to FIGS. 3 and 4, smoldering chamber 180 is fluidly coupled to chamber inlet 160 for providing the flow of smoke 164 into smoking chamber 120. In addition, firebox 150 may include a door 186 which is pivotally mounted on top of firebox 150 for providing selective access to smoldering chamber 180, e.g., to add additional combustible material 182. In addition, firebox 150 defines an air inlet 188 for receiving air to support the combustion or smoldering process. More specifically, as will be described in more detail below, indoor smoker 100 include an air handler 190 for urging a flow of air (indicated by reference numeral 192 in FIG. 3) into smoldering chamber 180 through air inlet 188 for facilitating the smoldering process and smoke generation. Controller 140 is generally configured for regulating smoldering heater 184 and air handler 190 to achieve the desired smoldering of combustible material 184 and the desired amount of smoke within smoking chamber 120.

As mentioned briefly above, indoor smoker 100 further includes an exhaust system 152 which is generally configured for safely discharging the flow of smoke 164 from indoor smoker 100. Specifically, according to the illustrated embodiment, exhaust system 152 generally extends between chamber outlet 162 and a discharge vent 200 defined by cabinet 102 for directing the flow of smoke 164 from smoking chamber 120 to the environment 154. Although an exemplary exhaust system 152 is described below, it should be appreciated that variations and modifications may be made while remaining within the scope of the present subject matter. For example, the routing of ducts, the position of fans and dampers, and the types of sensors used may vary according to alternative embodiments.

As shown, exhaust system 152 includes an exhaust duct 202 that generally provides fluid communication between chamber outlet 162 and discharge vent 200. More specifically, exhaust duct 202 extends between chamber outlet 162 and air handler 190. In addition, a recirculation duct 204 extends between exhaust duct 202 and discharge vent 200. For reasons described in more detail below related to flow recirculation, exhaust duct 202 and recirculation duct 204 are generally stacked along the vertical direction V and flow in the opposite directions. In this regard, for example, exhaust duct 202 is positioned upstream of air handler 190 and flows in a first lateral direction while recirculation duct 204 is positioned downstream of air handler 190 and flows in an opposite, second lateral direction.

As described briefly above, air handler 190 is operably coupled with exhaust duct 202 for urging the flow of smoke 164 from smoking chamber 120, through exhaust duct 202, through recirculation duct 204, and out of discharge vent 200 to environment 154. According to the illustrated exemplary embodiment, air handler 190 is a tangential fan positioned within exhaust duct 202. However, it should be appreciated that according to alternative embodiments, air handler 190 may be positioned at any other suitable location and may be any other suitable fan type, such as an axial fan, a centrifugal fan, etc. In addition, according to an exemplary embodiment, air handler 190 is a variable speed fan such that it may rotate at different rotational speeds, thereby generating different air flow rates. In this manner, the amount of smoke drawn from smoldering chamber 180 may be continuously and precisely regulated.

Referring still to FIGS. 3 and 4, indoor smoker 100 further includes a catalytic converter 210 which is positioned within exhaust duct 202 for lowering or removing volatile organic compounds (VOCs) from the flow of smoke 164. As used herein, "catalytic converter" or variations thereof may be used to refer to any component, machine, or device that is configured for removing or lowering volatile organic compounds (VOCs), toxic gases, harmful emissions, pollutants, or undesirable compounds from a flow of air and smoke. For example, according to the illustrated embodiment, catalytic converter 210 generally includes a catalytic element 212 and a catalyst heater 214. In general, catalytic element 212 includes a material that causes an oxidation and a reduction reaction. For example, precious metals such as platinum, palladium, and rhodium are commonly used as catalyst materials, though other catalysts are possible and within the scope of the present subject matter. In operation, the catalytic element 212 may combine oxygen ($O_2$) with carbon monoxide (CO) and unburned hydrocarbons to produce carbon dioxide ($CO_2$) and water ($H_2O$). In addition, according to exemplary embodiments, catalytic element 212 may remove nitric oxide (NO) and nitrogen dioxide ($NO_2$).

Notably, catalytic converters typically require that the catalyst be heated to a suitably high temperature in order to catalyze the necessary chemical reactions. Therefore, catalyst heater 214 is in thermal communication with catalytic element 212 for heating it to a suitable temperature, such as approximately 800° F. According to the illustrated embodiment, catalyst heater 214 is positioned upstream of catalytic element 212 to provide thermal energy through convection. However, it should be appreciated that according to alternative embodiments, catalyst heater 214 may be in direct contact with catalytic element 212 to provide thermal energy through conduction, or may be thermally coupled to catalytic element 212 in any other suitable manner.

Thus, during operation of indoor smoker 100, air handler 190 draws the flow of air 192 into smoldering chamber 180 through an air inlet 188. The flow of air 192 and combustible material 182 in the smoldering chamber 180 generate the flow of smoke 164 which is drawn into smoking chamber 120 through chamber inlet 160. The flow of smoke 164 passes through smoking chamber 120 for performing a smoking process on food items positioned therein before exiting smoking chamber 120 through chamber outlet 162. Air handler 190 and continues to urge the flow of smoke 164 through catalytic converter 210 and exhaust duct 202 before passing through recirculation duct 204 and out discharge vent 200.

Notably, the flow of smoke 164 can frequently have unacceptable levels of harmful emissions, such as carbon monoxide (CO) or other VOCs. While catalytic converter 210 is generally configured for lowering or removing some or all of these harmful emissions prior to discharging the flow of smoke 164 to environment 154, the emissions may remain at unacceptable levels during certain operating conditions, e.g., during startup or when improper combustible material 182 is used. Therefore, exhaust system 152 includes features for recirculating the flow of smoke 164 through catalytic converter 210 to further reduce the harmful missions below safe and acceptable levels during certain operating conditions.

In this regard, indoor smoker 100 further includes a recirculation port 220 that is defined between recirculation duct 204 and exhaust duct 202 upstream of catalytic converter 210. In addition, a damper 222 is operably coupled to recirculation port 220 and is configured for selectively regulating the flow of smoke 164 through recirculation port 220. In this regard, as shown for example in FIG. 4, when the level of VOCs within the flow of smoke 164 exceeds some acceptable predetermined threshold, damper 222 may open to permit the flow of smoke 164 to pass from recirculation duct 204, through recirculation port 220, and into exhaust duct 202 at a location upstream of catalytic converter 210. Recirculation port 220 may remain open and the flow of smoke 164 may be recirculated through catalytic converter 210 until the level of VOCs in the flow of smoke 164 drops below a predetermined level at which point the flow of smoke 164 may be discharged through discharge vent 200.

In order to measure the level of harmful emissions or VOCs within the flow of smoke 164, indoor smoker further includes a smoke sensor 224 that is positioned within recirculation duct 204 downstream of catalytic converter 210 and air handler 190. For example, smoke sensor 224 may be positioned just upstream of discharge vent 200 for ensuring that the flow of smoke 164 exiting discharge vent 200 always remains below a predetermined threshold. In general, smoke sensor 224 may be any suitable device or sensor that detects a level of VOCs within smoke. For example, smoke sensor 224 may be a photoelectric sensor that optically detects VOCs, an ionization smoke detector that uses an ionization reaction, a chemical detector, an opto-chemical sensor, a biomimetic sensor, an electrochemical sensor, a semiconductor sensor, or any other suitable type of sensor for detecting the presence or magnitude of a particular chemical or compound in a volume or flow of smoke.

According to exemplary embodiments, damper 222 may be positioned within recirculation port 220 for simply opening and closing that port. When opened, exhaust system 152 may rely on the negative pressure generated by air handler 190 to draw the flow of smoke 164 back into exhaust duct 202 and through catalytic converter 210. However, according to the illustrated embodiment, damper 222 is rotatably mounted within recirculation duct 204 and is movable between a first position (the "open" or "discharge" position) and a second position (the "closed" or "recirculation" position). Specifically, when damper 222 is in the discharge position (as shown in FIG. 3), recirculation port 220 is substantially blocked while discharge vent 200 is substantially open such that the flow of smoke 164 may exit indoor smoker 100. By contrast, when damper 222 is in the recirculation position (as shown in FIG. 4), recirculation port 220 is substantially open while discharge vent 200 is substantially blocked such that the flow of smoke 164 is forced to return through catalytic converter 210. Although two exemplary positions of damper 222 are described herein, it should be appreciated that damper 222 may be positioned at any suitable location between the open and closed positions to selectively regulate the ratio of the flow of smoke 164 exiting indoor smoker 100 to that passing through recirculation port 220.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An indoor smoker defining a vertical, a lateral, and a transverse direction, the indoor smoker comprising:
   a cabinet defining a discharge vent;
   a smoking chamber positioned within the cabinet and defining a chamber inlet and a chamber outlet;
   an exhaust duct providing fluid communication between the chamber outlet and the discharge vent;
   an air handler operably coupled with the exhaust duct for urging a flow of smoke from the smoking chamber, through the exhaust duct, and out of the discharge vent;
   a catalytic converter positioned within the exhaust duct for lowering volatile organic compounds from the flow of smoke;
   a recirculation duct extending between the exhaust duct and the discharge vent; and
   a damper operably coupled to the recirculation duct and being configured for selectively restricting the flow of smoke through the discharge vent.

2. The indoor smoker of claim 1, wherein the chamber inlet is defined proximate a bottom of the smoking chamber at a first side and the chamber outlet is defined proximate a top of the smoking chamber at a second side.

3. The indoor smoker of claim 1, wherein the catalytic converter comprises a catalytic element and a catalyst heater.

4. The indoor smoker of claim 1, wherein the air handler is a tangential fan positioned within the exhaust duct downstream of the catalytic converter.

5. The indoor smoker of claim 1, comprising at least one of a temperature sensor and a humidity sensor positioned within the smoking chamber.

6. The indoor smoker of claim 1, comprising:
   a recirculation port defined between the recirculation duct and the exhaust duct upstream of the catalytic converter, wherein the damper is configured for selectively regulating the flow of smoke through the recirculation port.

7. The indoor smoker of claim 6, wherein the damper is rotatably mounted within the recirculation duct and is movable between a first position where the recirculation port is substantially blocked and the discharge vent is substantially open, and a second position where the recirculation port is substantially open and the discharge vent is substantially closed.

8. The indoor smoker of claim 6, comprising:
   a smoke sensor positioned within the recirculation duct downstream of the catalytic converter for measuring a level of volatile organic compounds in the flow of smoke.

9. The indoor smoker of claim 8, wherein the damper is moved toward the second position when the measured level of volatile organic compounds exceeds a predetermined threshold or an acceptable emission level.

10. The indoor smoker of claim 1, comprising:
    a fire box defining a smoldering chamber for receiving combustible material, the smoldering chamber being fluidly coupled to the chamber inlet of the smoking chamber for providing the flow of smoke.

11. The indoor smoker of claim 10, wherein the fire box defines an air inlet through which a flow of air is drawn by the air handler, the flow of air and the combustible material generating the flow of smoke.

12. The indoor smoker of claim 10, wherein the combustible material comprises wood chips, wood pellets, or wood resin.

13. The indoor smoker of claim 10, comprising:
    a chamber heater in thermal communication with the smoking chamber for regulating a chamber temperature; and
    a smoldering heater in thermal communication with the smoldering chamber to smolder combustible material stored in the smoldering chamber.

14. The indoor smoker of claim 13, wherein the combustible material is smoldered when the smoldering heater heats the smoldering chamber to a smoldering temperature between about 650° F. and 750° F.

15. An exhaust assembly for an indoor smoker, the indoor smoker comprising a cabinet defining a discharge vent and a smoking chamber having a chamber outlet, the exhaust assembly comprising:
    an exhaust duct providing fluid communication between the chamber outlet and the discharge vent;
    an air handler positioned within the exhaust duct for urging a flow of smoke from the smoking chamber, through the exhaust duct, and out of the discharge vent;
    a catalytic converter positioned within the exhaust duct for lowering volatile organic compounds from the flow of smoke;
    a recirculation duct extending between the exhaust duct and the discharge vent;
    a recirculation port defined between the recirculation duct and the exhaust duct upstream of the catalytic converter; and
    a damper operably coupled to the recirculation port and being configured for selectively restricting the flow of smoke through the discharge vent or selectively regulating the flow of smoke through the recirculation port.

16. The exhaust assembly of claim 15, comprising:
    a fire box defining a smoldering chamber for receiving combustible material, the smoldering chamber being fluidly coupled to a chamber inlet of the smoking chamber for providing the flow of smoke, and wherein the fire box defines an air inlet through which a flow of air is drawn by the air handler, the flow of air and the combustible material generating the flow of smoke.

17. The exhaust assembly of claim 15, wherein the catalytic converter comprises a catalytic element and a catalyst heater.

18. The exhaust assembly of claim 15, wherein the damper is rotatably mounted within the recirculation duct and is movable between a first position where the recirculation port is substantially blocked and the discharge vent is substantially open, and a second position where the recirculation port is substantially open and the discharge vent is substantially closed.

19. The exhaust assembly of claim 18, comprising:
    a smoke sensor positioned within the recirculation duct downstream of the catalytic converter for measuring a level of volatile organic compounds in the flow of smoke.

20. The exhaust assembly of claim 19, wherein the damper is moved toward the second position when the measured level of volatile organic compounds exceeds a predetermined threshold or an acceptable emission level.

* * * * *